United States Patent
Von Ahnen et al.

(10) Patent No.: US 6,205,152 B1
(45) Date of Patent: Mar. 20, 2001

(54) FRAME RELAY-TO-ATM INTERFACE CIRCUIT AND METHOD OF OPERATION

(75) Inventors: Michael J. Von Ahnen, Plano; Sreejith Sreedharan, Richardson, both of TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/002,043

(22) Filed: Dec. 31, 1997

(51) Int. Cl.[7] ............................... H04J 3/24; H04Q 11/04
(52) U.S. Cl. .................... 370/419; 370/421; 370/462; 370/395
(58) Field of Search ..................... 370/399, 395, 370/352, 398, 389, 419, 440, 432, 353, 356, 465, 464, 474, 468; 709/238, 712, 235, 234, 212; 710/48, 52

(56) References Cited

U.S. PATENT DOCUMENTS

| | | | |
|---|---|---|---|
| 5,390,175 | * | 2/1995 | Hiller et al. ............................. 370/60 |
| 5,949,785 | * | 9/1999 | Beasley ................................. 370/398 |
| 6,046,999 | * | 4/2000 | Miki et al. ............................. 370/395 |
| 6,072,798 | * | 9/1999 | Beasley ................................. 370/395 |

* cited by examiner

*Primary Examiner*—Dang Ton
*Assistant Examiner*—Anthony Ton
(74) *Attorney, Agent, or Firm*—John C. Han

(57) ABSTRACT

There is disclosed, for use in a processing network containing a first node operable to transmit and receive frame relay data and a second node operable to transmit and receive asynchronous transfer mode (ATM) data, a network interface for converting the frame relay data to ATM data comprising: 1) a frame relay interface circuit operable to receive the frame relay data from the first node; 2) an ATM interface circuit operable to transmit the ATM data to the second node; 3) a data bus for coupling the frame relay interface circuit and the ATM interface circuit, the data bus operable to transfer frame payload data from the frame relay interface circuit to the ATM interface circuit; 4) a data traffic controller operable to receive frame header data from the frame relay interface circuit and control transfers of the frame payload data from the frame relay interface circuit to the ATM interface circuit; and 5) a bridge for coupling the data traffic controller to the data bus, the bridge isolating the data traffic controller from the transfers of the frame payload data.

33 Claims, 4 Drawing Sheets

FRAME RELAY-TO-ATM INTERFACE CIRCUIT AND METHOD OF OPERATION

TECHNICAL FIELD OF THE INVENTION

The present invention is directed, in general, to frame relay and ATM communications and, more specifically, to a traffic management interface for converting frame relay traffic to ATM traffic using an ASIC circuit for implementing a leaky bucket algorithm.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded.

A consequential development relating to the increased popularity of LANs has been the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. These include X.25, ISDN, and frame relay, among others.

Most data transmissions, including file transfers and voice, occur in bursts at random intervals. The bursty nature of most data transmissions means that if the bandwidth allocated to a transmitting device is determined according to its peak demand, much bandwidth is wasted during the "silences" between data bursts. This variable bandwidth demand problem has been solved in part by X.25 and frame relay, which use statistical multiplexing to improve the throughput of multiple users. Statistical multiplexing takes advantage of the bursty nature of data transmissions to allow a user to transmit bursts of data in excess of the user's allocated bandwidth for relatively short periods of time.

Frame relay has proved to be one of the most popular communication protocols. Frame relay provides up to T3 level speeds (from 56 Kbps up to about 45 Mbps) using packet switching technology. It is optimized for the transfer of protocol-oriented data in packets of variable length. Data is sent in high-level data link control packets, called "frames". A typical frame includes a "header", comprising an address block and a control block, a "payload" or data block that is the actual data to be transferred from endpoint to endpoint, and a CRC error correction block.

An end user transmits data according to a committed information rate (CIR) and a maximum burst size. Bandwidth is allocated dynamically on a packet-by-packet basis within the network. If the end user exceeds the CIR for a short period of time, the transmitted data is buffered within the frame relay network for later transmission. If this condition persists, however, traffic policing and congestion control mechanisms in the network, reduce the rate at which the end user transmits data.

Frame relay frames have only a small amount of "overhead" (i.e., header and CRC), only seven (7) bytes compared to hundreds of data bytes). However, the variable lengths of the payload cause variable length delays as the frames move through the network switches. This makes frame relay suitable to pure data transfers, but less suitable to the transfer of mixed voice, data and video. Additionally, the newest LAN/WAN applications, including file transfers, imaging, video conferencing, and the like, demand great amounts of bandwidth that cannot be serviced by frame relay.

ATM is a relatively new technology and currently represents only a comparatively small percentage of the installed network infrastructure. Frame relay still remains as a dominant portion of the installed network infrastructure. Additionally, since many information systems may never need video or other high bandwidth applications, it is unlikely that every LAN or WAN system will need to be converted to an ATM system. Hence, frame relay and ATM will likely coexist for a long period of time.

In order to allow frame relay systems and ATM systems to communicate with one another, a host of well-known interfaces have been developed to interconnect frame relay based networks with ATM based networks. These frame relay-to-ATM interfaces typically include a high-level data link control (HDLC) interface for sending and receiving frames from a frame relay-based network and a segmentation and reassembly (SAR) interface for sending and receiving cells from an ATM-based network. Between the HDLC and the SAR, a memory holds the payloads of the frames and/or cells, and a traffic control processor monitors the traffic for every connection and adjusts the traffic flow based on a leaky bucket software routine. The traffic control processor also provides the frame switching and forwarding functions for every connection.

However, the prior art frame relay-to-ATM interfaces are limited by the processing capabilities of the traffic control processor and the memory used to store the cell and frame payloads. The traffic control processor performs a traffic policing algorithm for every connection. As the number of connections grows, the traffic control processor consumes larger amounts of processing power for traffic policing. For comparatively large frames, the traffic control processor can read the frame header information and implement the leaky bucket algorithm for each frame received from a user. However, as large numbers of comparatively small frames are received, the processor spend an increasingly large amount of time reading header information and implementing traffic flow calculations.

Furthermore, the traffic control processor and payload memory are typically coupled to the HDLC and the SAR by a common bus. The foreground tasks executed by the traffic control processor, such as implementing the leaky bucket algorithm, must therefore be stalled while frame payloads and cell payloads are stored in the payload memory by the HDLC and the SAR. A similar problem occurs when ATM cells must be reassembled into a large number of comparatively small frames.

The end result is that the traffic control processor frequently cannot keep up with data traffic and the performance of the frame relay-to-ATM interface deteriorates. Consequently, at least part of the data traffic frequently must be re-transmitted in order to complete the transfer.

There is therefore a need in the art for an improved frame relay-to-ATM interface capable of processing a large volume of data traffic with minimal deterioration in performance. In particular, there is a need for an improved frame relay-to-ATM interface that minimizes the amount of processing performed by the traffic control processor. More particularly, there is a need for an improved frame relay-to-ATM interface that implements a traffic policing and congestion control algorithm, such as a leaky bucket algorithm, using a minimal amount of traffic control processor time.

SUMMARY OF THE INVENTION

To address the above-discussed deficiencies of the prior art, it is a primary object of the present invention to provide, for use in a processing network containing a first node operable to transmit and receive frame relay data and a second node operable to transmit and receive asynchronous transfer mode (ATM) data, a network interface for converting the frame relay data to ATM data comprising: 1) a frame relay interface circuit operable to receive the frame relay data from the first node; 2) an ATM interface circuit operable to transmit the ATM data to the second node; 3) a data bus for coupling the frame relay interface circuit and the ATM interface circuit, the data bus operable to transfer frame payload data from the frame relay interface circuit to the ATM interface circuit; 4) a data traffic controller operable to receive frame header data from the frame relay interface circuit and control transfers of the frame payload data from the frame relay interface circuit to the ATM interface circuit; and 5) a bridge for coupling the data traffic controller to the data bus, the bridge isolating the data traffic controller from the transfers of the frame payload data.

In one embodiment of the present invention, the frame header data includes a committed information rate associated with a selected connection and the data traffic controller determines a bandwidth availability for the connection. In some embodiments, the data traffic controller performs a leaky bucket calculation to determine the bandwidth availability for the connection. In other embodiments, the data traffic controller comprises a programmable logic gate array for performing the leaky bucket calculation.

In alternate embodiments of the present invention, the data traffic controller comprises a processor and a local memory associated with the processor. The frame header data includes a committed information rate associated with a selected connection and the processor determines a bandwidth availability for the connection. Additionally, the processor performs a leaky bucket calculation to determine the bandwidth availability for the connection.

In still other embodiments, the data traffic controller further comprises a programmable logic gate array. The frame header data includes a committed information rate associated with a selected connection and the programmable logic gate array determines a bandwidth availability for the connection. The programmable logic gate array may perform a leaky bucket calculation to determine the bandwidth availability for the connection.

In other embodiments of the present invention, the network interface further comprises a payload memory coupled to the data bus for storing the frame payload data.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
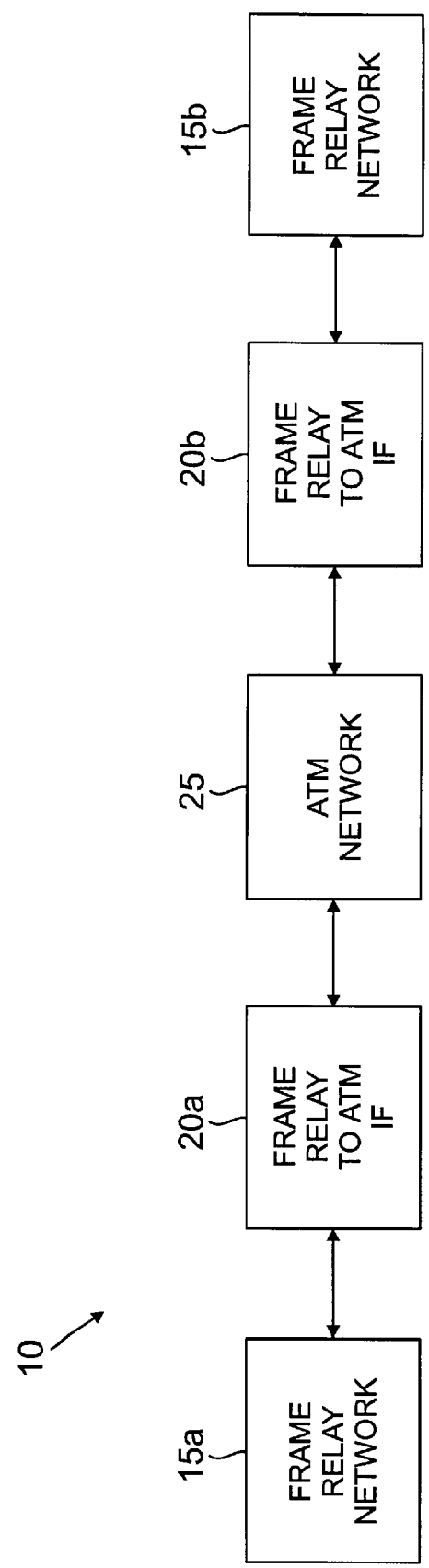
FIG. 1 illustrates an exemplary network infrastructure that interconnects frame relay-based networks and ATM-based networks.

FIG. 1 illustrates an exemplary network infrastructure 10 that interconnects frame relay-based networks and ATM-based networks. Network infrastructure 10 comprises a first frame relay network 15a that is operable to communicate with a second frame relay network 15b via an interconnecting ATM network 25. Frame relay network 15a communicates with ATM network 25 via a first frame relay-to-ATM interface circuit 20a. ATM network 25 communicates with frame relay network 15b via a second frame relay-to-ATM interface circuit 20b. Frame relay-to-ATM interface circuits 20a and 20b provide means for converting frame relay data frames into ATM cells as data is sent from the frame relay networks 15a and 15b into the ATM network 25. Frame relay-to-ATM interface circuits 20a and 20b also provide means for converting ATM cells to frame relay data frames as data is sent from the ATM network 25 into the frame relay networks 15a and 15b.

Figure 2:
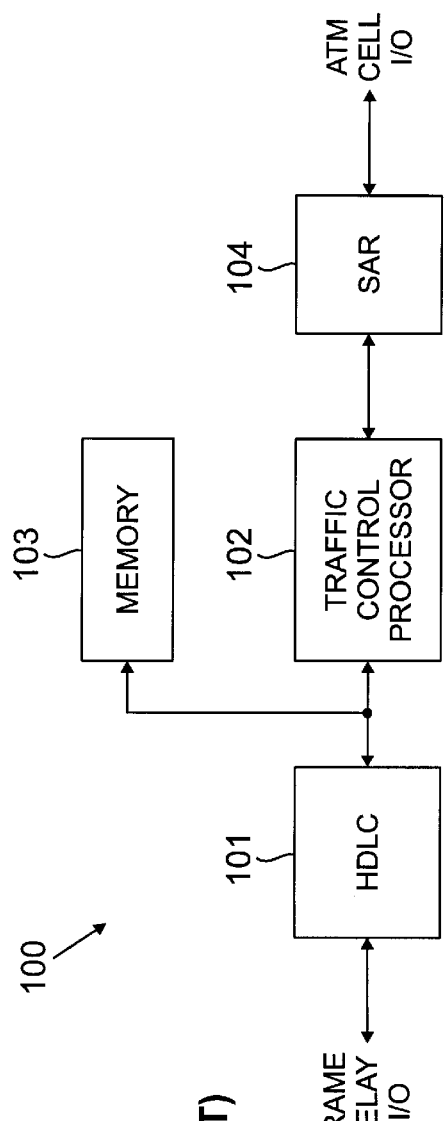
FIG. 2 illustrates a frame relay-to-ATM interface circuit according to the prior art.

FIG. 2 illustrates an exemplary frame relay-to-ATM interface circuit 100 according to the prior art. Interface circuit 100 performs tasks that are functionally equivalent to the frame relay-to-ATM interface circuits 15a and 15b. Interface circuit 100 provides communications between a frame relay-based local area network (LAN) or wide area network (WAN) and an asynchronous transfer mode (ATM) LAN or WAN. Interface circuit 100 comprises a high-level data link control (HDLC) interface 101 (hereafter, the "HDLC 101"), a central processing unit (CPU) 102, a memory 103, and a segmentation and reassembly (SAR) interface 104 (hereafter, the "SAR 104"). The HDLC 101 sends and receives data "frames" (referred to as "frame relay I/O") to and from the frame relay based LAN or WAN. The SAR 104 sends and receives asynchronous transfer mode (ATM) data "cells" (referred to as "ATM cell I/O") to and from the ATM based LAN or WAN.

The operation of the prior art frame relay-to-ATM interface is well-known. When frame relay data is being converted to ATM format, a data frame is initially received by HDLC 101. The HDLC 101 extracts the variable-length payload from the frame relay packet and stores the payload in memory 103. The HDLC 101 then signals the traffic control processor 102 that it has received a frame packet and sends the connection information in the packet header to the traffic control processor 102.

Next, the traffic control processor 102 reads the packet header and determines to which connection the received frame corresponds, as well as the committed information rate (CIR) associated with that connection. The connection information and the CIR data are stored in the memory 103. The traffic control processor 102 may service multiple connections at once. For each connection, the amount of data transmitted per unit of time is measured against the average data rate (or CIR) and the peak allowable rate to determine if the transmitting node must be "throttled" in order to adjust its data transmission rate. To do so, the CPU 102 performs a dual leaky bucket bandwidth calculation and determines if there is sufficient bandwidth available to forward the data packet to the ATM network.

The leaky bucket algorithm effectively polices traffic flow in order to prevent congestion from occurring. There are a variety of well-known leaky bucket algorithms, each suited to a particular type of traffic flow. The leaky bucket algorithm implemented in software by traffic control processor 102 and memory 103 determines if there is an excess amount of bandwidth above the amount committed for the connection, or above the peak burst rate. If so, the traffic control processor 102 may discard some or all of the transmitted data, thereby causing a retransmission from the originating node in the frame relay network.

In the final step, the payload of the frame received by HDLC 101 is transferred from memory 103 to the SAR 104. The SAR 104 then segments the frame into 48-byte payloads for ATM cells and attaches 5-bytes of header information for the connection specified by the traffic control processor 102.

It can be seen from the foregoing description of the prior art frame relay-to-ATM interface circuit 100 that the conversion from frame relay data frames to ATM cells is a processor intensive activity that forces the traffic control processor 102 to operate at a very high duty cycle. If the frame relay input data received by the HDLC 101 comprises a large number of comparatively small-sized frames, the traffic control processor must spend an excessive amount of time performing leaky bucket bandwidth calculations for each frame received for each connection. This problem is particularly acute if there are a large number of connections being service by the interface. At some point, the traffic control processor 102 will be unable to perform leaky bucket bandwidth calculations for every frame and every connection and still transfer the frame payload to the SAR 104 as rapidly as the frames are received by the HDLC 101. As a result, the overall performance of the frame relay-to-ATM interface 100 deteriorates.

The present invention overcomes the limitations inherit in the prior art frame relay-to-ATM interface circuit by implementing a dual leaky bucket bandwidth algorithm in a hardware circuit separate from the traffic control processor. In one embodiment of the present invention, a programmable logic application specific integrated circuit (ASIC) and a dedicated static random access memory (SRAM) device perform the leaky bucket bandwidth calculation as a background processing activity, thereby reducing the foreground execution tasks performed by the traffic control processor. The present invention also minimizes the workload on the traffic control processor by coupling the traffic control processor, its associated local memory and the leaky bucket algorithm ASIC to a local CPU bus and by coupling the HDLC, the SAR and a separate "payload" memory to a separate personal computer interface (PCI) bus.

Figure 3:
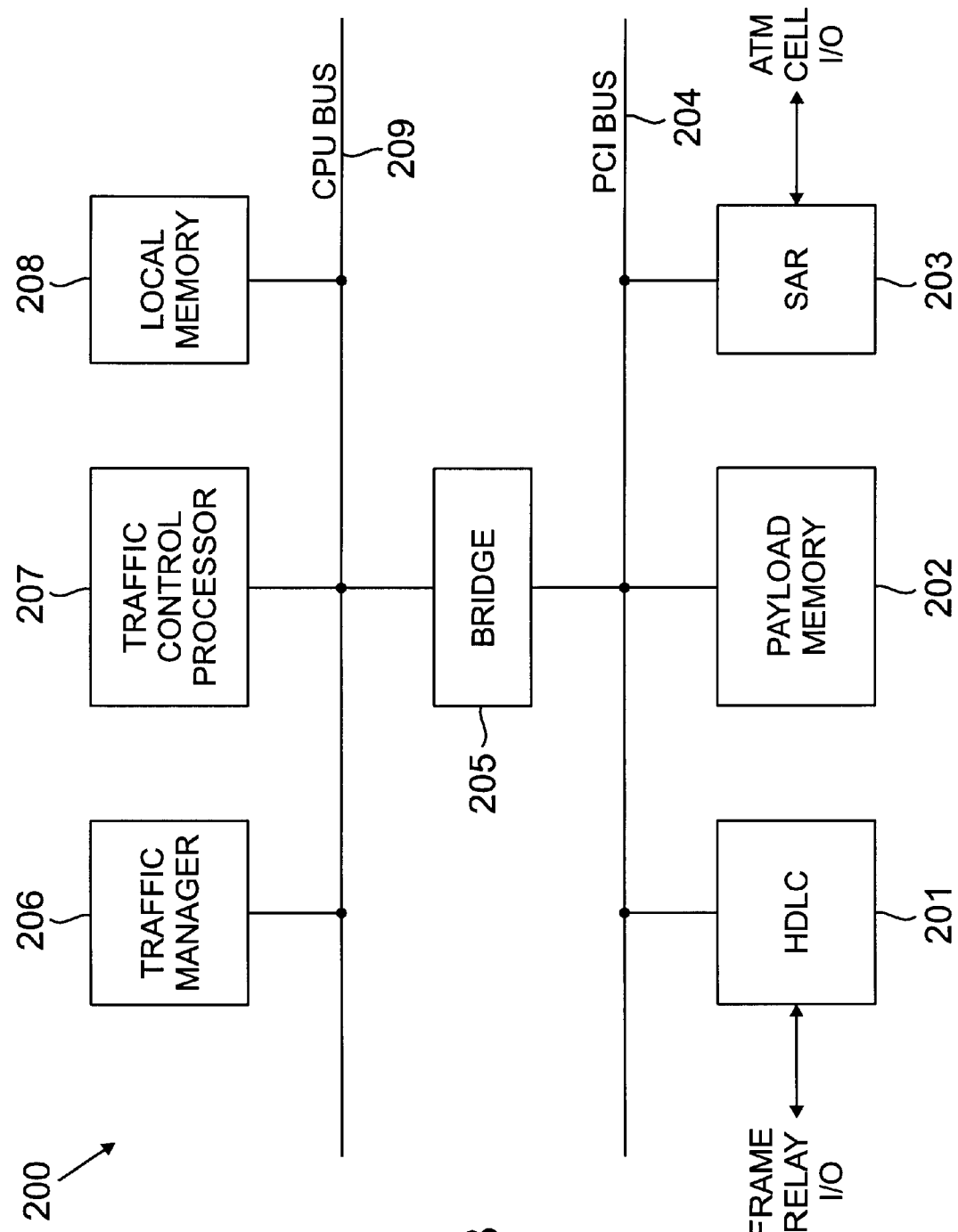
FIG. 3 illustrates an improved frame relay-to-ATM interface circuit according to an exemplary embodiment of the present invention.

FIG. 3 illustrates an improved frame relay-to-ATM interface circuit 200 according to an exemplary embodiment of the present invention. Interface circuit 200 performs tasks that are functionally equivalent to the frame relay-to-ATM interface circuits 15a and 15b. As in the case of the prior art interface circuit 100, interface circuit 200 provides communications between a frame relay based LAN or WAN and an asynchronous transfer mode (ATM) based LAN or WAN. Interface circuit 200 comprises a PCI bus 204 that couples together a high-level data link control (HDLC) interface 201 (hereafter, the "HDLC 201"), a "payload" memory 202, and a segmentation and reassembly (SAR) memory 203 (hereafter, the "SAR 203"). The HDLC 201 sends and receives data "frames" (referred to as "frame relay I/O") to and from the frame relay based LAN or WAN. The SAR 203 sends and receives asynchronous transfer mode (ATM) data "cells" (referred to as "ATM cell I/O") to and from the ATM based LAN or WAN.

The interface circuit 200 also comprises a CPU bus 209 that couples together a traffic manager 206, a central processing unit (CPU) 207, and a local memory 208. A bridge 205 provides communications between the devices on the PCI bus 204 and the devices on the CPU bus 209. The bridge 205, which may be any one of a number of well-known types of data bridge, isolates data transfers on the PCI bus 204 and the CPU bus 209, thereby allowing simultaneous use of both. The local memory 208 contains the program executed by the traffic control processor 207 and also stores the connection information associated with each connection being serviced by the interface circuit 200.

The dual bus structure of interface circuit 200 prevents conflicts between the data transfers into and out of payload memory 202 on PCI bus 204 and the bus cycles of the traffic control processor 207 on CPU bus 209. Thus, when the HDLC 201 transfers data frames into the payload memory 202, and when SAR 203 reads the data frames out of the payload memory 202, this activity does not prevent the traffic control processor 207 from interacting with the local memory 208 and the traffic manager 206 on the CPU bus 209. Advantageously, this allows the improved interface circuit 200 to process larger bursts of comparatively short data frames.

In one embodiment of the present invention, traffic flow control may be provided by performing leaky bucket bandwidth calculations in software using the traffic control processor 207 and the local memory 208, in a manner similar to the prior art in FIG. 1. However, in a preferred embodiment of the present invention, bandwidth calculations using a dual leaky bucket algorithm are performed in traffic manager 206, which is implemented in a faster hardware circuit. Performing the dual leaky bucket bandwidth calculations in the traffic manager 206 further reduces the processing overhead of traffic control processor 207, thereby allowing traffic control processor 207 to handle a higher rate of received data frames from the frame relay network. This enables the improved interface circuit 200 to keep pace with still larger bursts of comparatively short data frames.

Figure 4:
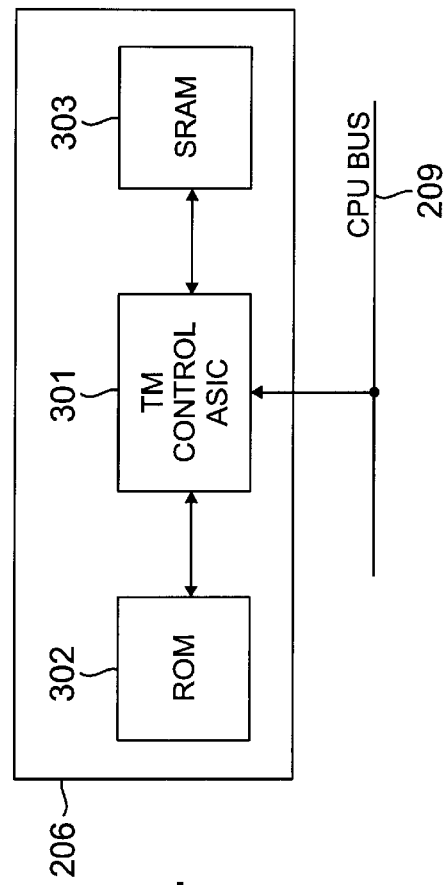
FIG. 4 illustrates a traffic manager circuit for use in the interface circuit in FIG. 2 according to an exemplary embodiment of the present invention.

FIG. 4 illustrates an exemplary traffic manager circuit 206 for use in the improved interface circuit in FIG. 3 according to an exemplary embodiment of the present invention. The traffic manager 206 comprises a traffic manager (TM) control ASIC 301, a read-only memory (ROM) 302, and a static random access memory (SRAM) 303. ROM 302 stores the instruction codes needed to program the TM control ASIC 301 to perform leaky bucket bandwidth calculations using the connection information provided by traffic control processor 207 via CPU bus 209. When committed information rate (CIR) data and other connection information are received from traffic control processor 207, the TM control ASIC 301 executes the dual leaky bucket bandwidth calculations and stores calculation results, connection parameters, and other information in SRAM 303.

In a preferred embodiment of the present invention, the TM control ASIC 301 is a field programmable logical gate array (FPGA) device, such as an ALTERA® FLEX® 10K programmable logic circuit. Upon power-up, the programming logic stored in ROM 302 is transferred to the TM control ASIC 301. APPENDIX A of this application contains an exemplary very high speed integrated circuits hardware description language (VHDL) program that may be used to implement a dual leaky bucket algorithm in an ALTERA® FLEX® 10K FPGA device.

Figure 5:
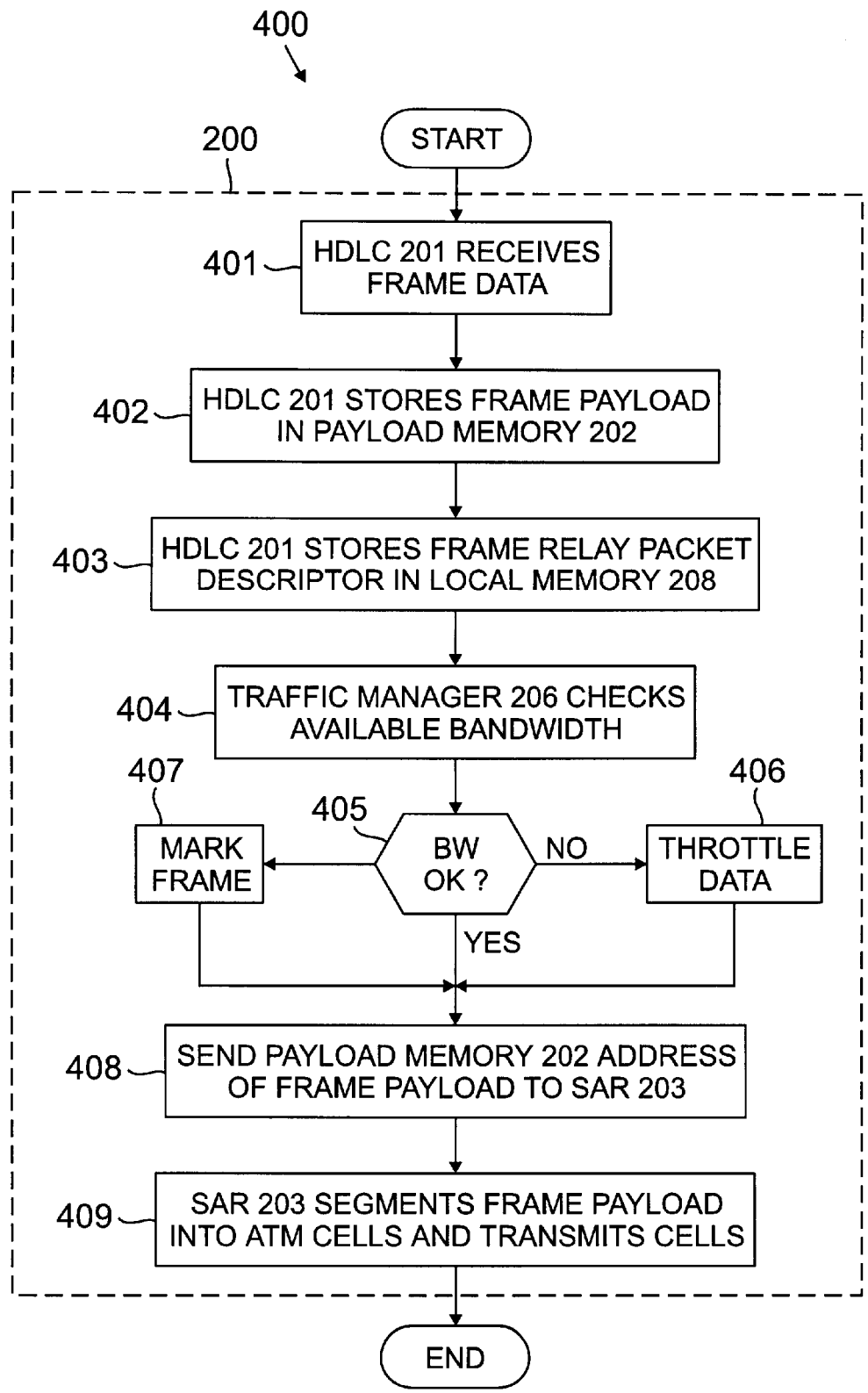
FIG. 5 is a flow diagram illustrating the operation of an exemplary frame relay-to-ATM interface circuit according to one embodiment of the present invention.

FIG. 5 is a flow diagram 400 illustrating the operation of an exemplary frame relay-to-ATM interface circuit 200 according to one embodiment of the present invention. Initially, frame relay data frames are received by the HDLC 201 and the header information (i.e., packet descriptor) is stripped from the payload of the data frame (process step 401). The HDLC 201 then stores the frame payload in payload memory 202 (process step 402).

The HDLC 201 then signals the traffic control processor 207 that it has received a frame packet and stores the connection information from the packet descriptor in local memory 208 via bridge 205 (process step 403). It is noted that since the header information of a frame relay data frame is usually a small fraction of the size of the payload of the data frame, the storage of the header information in the local memory 208 uses only a small amount of the bus cycle bandwidth on the CPU bus 209.

The traffic control processor 207 reads the connection information now stored in the local memory 208 and sends selected portions of this information, such as the connection CIR and the packet size, to the traffic manager 206 in order to determine if sufficient bandwidth is available for that connection. The traffic manager 206 uses the connection information to verify if sufficient bandwidth is available (process step 404). In one embodiment of the present invention, the dual leaky bucket algorithm performed by traffic manager 206 monitors the average data rate (i.e., CIR) used by the connection, the committed burst size, and the excess burst size. In one embodiment of the present invention, the traffic manager 206 provides the traffic control processor 207 with a simple "yes," "yes-mark," or "no" signal indicating whether or not the received data frame can be handled within the available bandwidth constraints negotiated for the committed connection. If the result is "yes-mark", the frame is allowed to pass to the network, but is marked for discard in case of congestion in the network (process steps 405, 406, and 407).

It is noted that performing the leaky bucket calculations in a hardwired circuit, such as an ASIC, greatly reduces the processing overhead of the traffic control processor 207 and correspondingly reduces the number of bus cycles on the CPU bus 209 associated with performing the leaky bucket calculations.

In some embodiments of the present invention, if there is not enough bandwidth remaining to handle the received data frame, traffic control processor 207 sends a THROTTLE DATA signal back to the transmitting network. This causes the transmitting network to throttle (reduce) its data transmission rate accordingly (process steps 405 and 407). The traffic control processor 207 may then continue to transmit the data frame to the ATM network, or may discard some or all of the data frame, thereby causing at least a partial re-transmission of the original data frame by the originating frame relay network.

If sufficient bandwidth is available to transfer the data packet to the ATM network, the traffic control processor 207 informs the SAR 203 of the starting address in payload memory 202 of the frame payload received by the HDLC 201 (process steps 405 and 408). The SAR 203 then reads the frame payload from the payload memory 202, segments the frame payload into 48-byte ATM payloads, and attaches a 5-byte header according to connection information received from the traffic control processor 207. The 53-byte ATM cells are then transmitted into the ATM-based network (process step 409).

In the reverse direction, ATM cells that are received by the SAR 203 of the frame relay-to-ATM interface circuit 200 are stored in the payload memory 202 and assembled into frames by the HDLC 201 for transmission into the frame relay-based network. Preferably, it is not necessary for the frame relay-to-ATM interface circuit 200 to perform leaky bucket bandwidth calculation on the received ATM cells or to throttle the ATM cells, since a corresponding frame relay-to-ATM interface circuit transmitting from the opposite side of the ATM network would already have performed leaky bucket bandwidth calculations and applied any necessary data throttling to the ATM cells received by the frame relay-to-ATM interface circuit 200.

Although the present invention has been described in detail, those skilled in the art should understand that they can make various changes, substitutions and alterations herein without departing from the spirit and scope of the invention in its broadest form.

What is claimed is:

1. For use in a processing network containing a first node operable to transmit and receive frame relay data and a second node operable to transmit and receive asynchronous transfer mode (ATM) data, a network interface for converting said frame relay data to said ATM data comprising:

a frame relay interface circuit operable to receive said frame relay data from said first node;

an ATM interface circuit operable to transmit said ATM data to said second node;

a data bus for coupling said frame relay interface circuit and said ATM interface circuit, said data bus operable to transfer frame payload data from said frame relay interface circuit to said ATM interface circuit;

a data traffic controller operable to receive frame header data from said frame relay interface circuit and control transfers of said frame payload data from said frame relay interface circuit to said ATM interface circuit; and a bridge for coupling said data traffic controller to said data bus, said bridge isolating said data traffic controller from said transfers of said frame payload data.

2. The network interface set forth in claim 1 wherein said frame header data includes a committed information rate associated with a selected connection and said data traffic controller determines a bandwidth availability for said connection.

3. The network interface set forth in claim 2 wherein said data traffic controller performs a leaky bucket calculation to determine said bandwidth availability for said connection.

4. The network interface set forth in claim 3 wherein said data traffic controller comprises a programmable logic gate array for performing said leaky bucket calculation.

5. The network interface set forth in claim 1 wherein said data traffic controller comprises a processor and a local memory associated with said processor.

6. The network interface set forth in claim 5 wherein said frame header data includes a committed information rate associated with a selected connection and said processor determines a bandwidth availability for said connection.

7. The network interface set forth in claim 6 wherein said processor performs a leaky bucket calculation to determine said bandwidth availability for said connection.

8. The network interface set forth in claim 5 wherein said data traffic controller further comprises a programmable logic gate array.

9. The network interface set forth in claim 8 wherein said frame header data includes a committed information rate associated with a selected connection and said programmable logic gate array determines a bandwidth availability for said connection.

10. The network interface set forth in claim 9 wherein said programmable logic gate array performs a leaky bucket calculation to determine said bandwidth availability for said connection.

11. The network interface set forth in claim 1 further comprising a payload memory coupled to said data bus for storing said frame payload data.

12. A processing network comprising:
a first node operable to transmit and receive frame relay data;
a second node operable to transmit and receive asynchronous transfer mode (ATM) data; and
a network interface for converting said frame relay data to said ATM data comprising:
a frame relay interface circuit operable to receive said frame relay data from said first node;
an ATM interface circuit operable to transmit said ATM data to said second node;
a data bus for coupling said frame relay interface circuit and said ATM interface circuit, said data bus operable to transfer frame payload data from said frame relay interface circuit to said ATM interface circuit;
a data traffic controller operable to receive frame header data from said frame relay interface circuit and control transfers of said frame payload data from said frame relay interface circuit to said ATM interface circuit; and
a bridge for coupling said data traffic controller to said data bus, said bridge isolating said data traffic controller from said transfers of said frame payload data.

13. The processing network set forth in claim 12 wherein said frame header data includes a committed information rate associated with a selected connection and said data traffic controller determines a bandwidth availability for said connection.

14. The processing network set forth in claim 13 wherein said data traffic controller performs a leaky bucket calculation to determine said bandwidth availability for said connection.

15. The processing network set forth in claim 14 wherein said data traffic controller comprises a programmable logic gate array for performing said leaky bucket calculation.

16. The processing network set forth in claim 12 wherein said data traffic controller comprises a processor and a local memory associated with said processor.

17. The processing network set forth in claim 16 wherein said frame header data includes a committed information rate associated with a selected connection and said processor determines a bandwidth availability for said connection.

18. The processing network set forth in claim 17 wherein said processor performs a leaky bucket calculation to determine said bandwidth availability for said connection.

19. The processing network set forth in claim 16 wherein said data traffic controller further comprises a programmable logic gate array.

20. The processing network set forth in claim 19 wherein said frame header data includes a committed information rate associated with a selected connection and said programmable logic gate array determines a bandwidth availability for said connection.

21. The processing network set forth in claim 20 wherein said programmable logic gate array performs a leaky bucket calculation to determine said bandwidth availability for said connection.

22. The processing network set forth in claim 12 further comprising a payload memory coupled to said data bus for storing said frame payload data.

23. For use in a processing network containing a first node operable to transmit and receive frame relay data and a second node operable to transmit and receive asynchronous transfer mode (ATM) data, a method for converting frame relay data to ATM data comprising the steps of:
receiving the frame relay data from the first node in a frame relay interface circuit;
transferring the frame relay data to an ATM interface circuit across a data bus;
transferring frame header data from the frame relay interface circuit to a data traffic controller via a bridge coupled to the data bus, wherein the bridge isolates the data traffic controller from the transfer of the frame relay data to the ATM interface circuit across the data bus; and
transmitting the ATM data to the second node.

24. The method set forth in claim 23 wherein the frame header data includes a committed information rate associated with a selected connection and the data traffic controller determines a bandwidth availability for the connection.

25. The method set forth in claim 24 wherein the data traffic controller performs a leaky bucket calculation to determine the bandwidth availability for the connection.

26. The method set forth in claim 25 wherein the data traffic controller comprises a programmable logic gate array for performing the leaky bucket calculation.

27. The method set forth in claim 23 wherein the data traffic controller comprises a processor and a local memory associated with the processor.

28. The method set forth in claim 27 wherein the frame header data includes a committed information rate associated with a selected connection and the processor determines a bandwidth availability for the connection.

29. The method set forth in claim 28 wherein said processor performs a leaky bucket calculation to determine said bandwidth availability for said connection.

30. The method set forth in claim 27 wherein the data traffic controller further comprises a programmable logic gate array.

31. The method set forth in claim 30 wherein the frame header data includes a committed information rate associated with a selected connection and the programmable logic gate array determines a bandwidth availability for the connection.

32. The network interface set forth in claim 31 wherein the programmable logic gate array performs a leaky bucket calculation to determine the bandwidth availability for the connection.

33. The network interface set forth in claim 23 further comprising a payload memory coupled to the data bus for storing the frame payload data.

* * * * *